(12) United States Patent
Chenchev et al.

(10) Patent No.: US 11,797,328 B2
(45) Date of Patent: Oct. 24, 2023

(54) VIRTUALIZED BACKGROUND ACTIVATIONS

(71) Applicant: MICROSOFT TECHNOLOGY LICENSING, LLC, Redmond, WA (US)

(72) Inventors: Margarit Chenchev, Sammamish, WA (US); Benjamin M. Schultz, Bellevue, WA (US); Gopikrishna Kannan, Redmond, WA (US); Graham Wong, Kirkland, WA (US); Harish Srinivasan, Sammamish, WA (US); Arup Roy, Seattle, WA (US); Hari Pulapaka, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 416 days.

(21) Appl. No.: 16/601,483

(22) Filed: Oct. 14, 2019

(65) Prior Publication Data

US 2021/0109774 A1    Apr. 15, 2021

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01)

(58) Field of Classification Search
CPC ......... G06F 2009/4557; G06F 8/45558; G06F 8/5077
See application file for complete search history.

(56) References Cited

U.S. PATENT DOCUMENTS

| | | | |
|---|---|---|---|
| 7,191,441 B2 | 3/2007 | Abbott et al. | |
| 8,505,014 B2 | 8/2013 | Kuck et al. | |
| 8,972,977 B2 | 3/2015 | Neil | |
| 9,286,097 B2 * | 3/2016 | Rothman | G06F 9/485 |
| 9,736,050 B2 | 8/2017 | Gatta et al. | |
| 2010/0257524 A1 | 10/2010 | Weissman et al. | |

(Continued)

FOREIGN PATENT DOCUMENTS

EP    3062225 A1    8/2016

OTHER PUBLICATIONS

Lattanzi, et al., "VirtualSense: A Java-Based Open Platform for Ultra-Low-Power Wireless Sensor Nodes", In International Journal of Distributed Sensor Networks, vol. 8, Issue 11, Nov. 8, 2012, pp. 1-16.

(Continued)

*Primary Examiner* — Jacob D Dascomb

(57) ABSTRACT

A virtualization partition (VP) is executed by a virtualization layer. The VP contains guest software that executes in isolation within the VP. The guest software has a background task (BT) that needs to be performed in the future. The BT is virtualized by a BT service that executes outside of the VP. The guest software registers the BT, through the virtualization layer, with a BT virtualization service. An event occurs outside of the VP that triggers the BT. The BT virtualization service responds to the event by assuring that the VP is available (executing), and optionally triggers (possibly indirectly) the execution of code in the application.

20 Claims, 8 Drawing Sheets

(56) References Cited

U.S. PATENT DOCUMENTS

| | | | |
|---|---|---|---|
| 2011/0265077 A1* | 10/2011 | Collison | G06F 8/60 |
| | | | 717/172 |
| 2011/0289503 A1 | 11/2011 | Toub et al. | |
| 2013/0061249 A1* | 3/2013 | Schwartz, Jr. | G06F 9/44521 |
| | | | 718/100 |
| 2013/0227554 A1* | 8/2013 | Tsirkin | G06F 9/45558 |
| | | | 718/1 |
| 2014/0047323 A1* | 2/2014 | Bourke | G06F 9/542 |
| | | | 715/234 |
| 2016/0203012 A1* | 7/2016 | Dong | G06F 9/455 |
| | | | 718/1 |
| 2017/0063722 A1* | 3/2017 | Cropper | G06F 9/5061 |
| 2017/0286153 A1* | 10/2017 | Bak | G06F 9/542 |
| 2018/0232038 A1 | 8/2018 | Surdu | |

OTHER PUBLICATIONS

"International Search Report and Written Opinion Issued in PCT Application No. PCT/US20/054460", dated Feb. 4, 2021, 12 Pages.

* cited by examiner

VIRTUALIZED BACKGROUND ACTIVATIONS

BACKGROUND

Virtualization partitions (VPs) have seen increasing use for reasons such as security, administrative convenience, portability, and maximizing utilization of hardware resources, among others. VPs are provided by virtualization environments or virtualization layers such as type-1 and type-2 hypervisors, kernel-based virtualization modules, etc. Two types of VPs are virtual machines (VMs) and containers. However, the distinction between types of VPs have blurred and there are many architectures for providing isolated access to virtualized hardware. For convenience, the term "virtualization layer" will be used herein to refer to any architecture or virtualization model that virtualizes hardware access for VPs such as VMs, containers, and their relatives. The term is considered to include virtualization functionality commonly implemented at least in part in a privileged VP (e.g. a root partition). Virtual machines (VMs), VM managers (VMMs), container engines, and kernel-based virtualization modules, are some examples of virtualization layers.

While VPs have many benefits, as only the inventors have appreciated, in some important instances virtualization may not be functionally transparent to guest software executing in a VP. Sometimes virtualization affects the behavior of guest software. From the perspective of guest software in a VP, the guest software is generally unaware that it is executing in the VP. Nonetheless the VP itself is a construct subject to the control of the virtualization layer; what happens to the VP can affect the guest software executing within it.

Guest software is usually designed to function as though in a physical host environment (i.e., under an operating system executing on bare metal). The guest software may assume the continuous availability of the environment it runs within. For example, if a guest application has armed a recurring alarm to trigger the application to periodically perform a maintenance task, then the application will expect the alarm to be both fired and responded to. Similarly, an application may assume that it will be able to execute to honor handling of external events such as push notifications or network messages. However, as only the inventors have observed, the virtualization layer can manipulate a VP in numerous ways that can interfere with these application expectations. The virtualization layer might pause a VP, place a VP in a low-power mode, delete a VP, or starve the VP of processor execution time. In these types of situations, which will be referred to collectively as an unavailable VP, the guest application may not perform as intended. If the application's VP has been rendered unavailable (e.g., paused), then an alarm within the VP will not be able to fire and the corresponding application task will not be performed. A problem can occur even when a background event is able to occur. A component outside the VP may generate a background event for a guest application in the VP, but the event may go unanswered because the unavailability of the VP causes unavailability of the guest application.

Techniques for facilitating background tasks in VPs are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A virtualization partition (VP) is executed by a virtualization layer. The VP contains guest software that executes in isolation within the VP. The guest software has a background task (BT) that needs to be performed in the future. The BT is virtualized by a BT service that executes outside of the VP. The guest software registers the BT, through the virtualization layer, with a BT virtualization service. An event occurs outside of the VP that triggers the BT. The BT virtualization service responds to the event by assuring that the VP is available (executing), and optionally triggers (possibly indirectly) the execution of code in the application.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
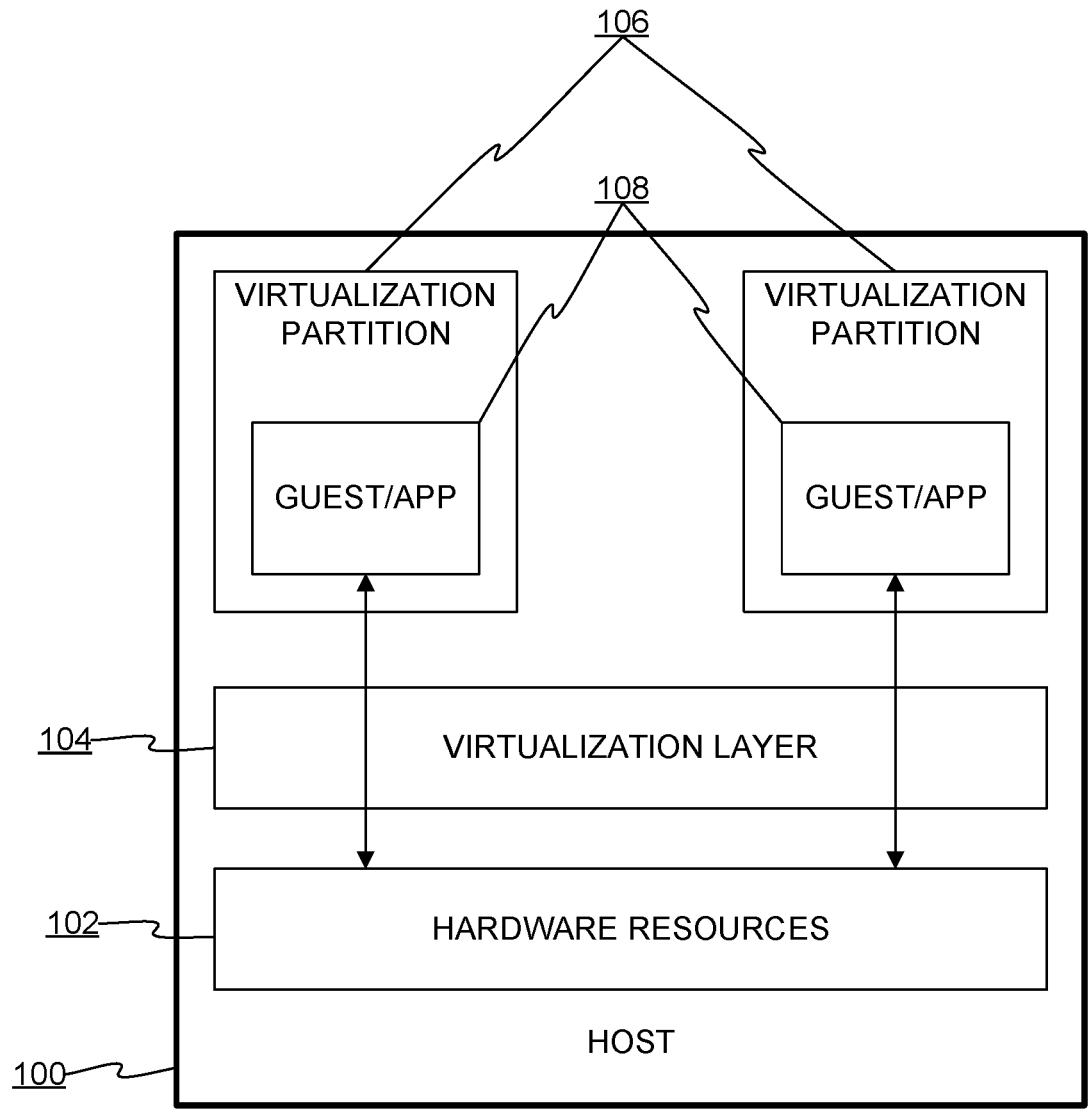
FIG. 1 shows a virtualization environment on a host computing device.

FIG. 1 shows a virtualization environment on a host 100 computing device. The host has hardware resources 102 such as memory, persistent storage, processing hardware, a network interface, and the like. A virtualization layer 104 virtualizes access to the hardware resources 102 for virtualization partitions (VPs) 106. The virtualization layer 104 may present each VP 106 with its own view of a subset of the hardware resources and while multiplexing access to those hardware resources among the VPs 106. Typically, the virtualization layer 104 will provide each VP 106 with a private portion of physical memory and may handle address translation between the VP memory address space and host-side address space. The virtualization layer 104 may also divide processor time among the VPs as well as host-side processes. The VPs 106 may have their own kernels, may share the host's kernel, or both. Regardless of the extent and nature of the resource virtualization, guest software or guest applications 108 in any given VP 106 are unable to access the content and resources of other VPs. That is, the VPs are isolated with respect to each other and are mostly isolated from the host.

Figure 2:
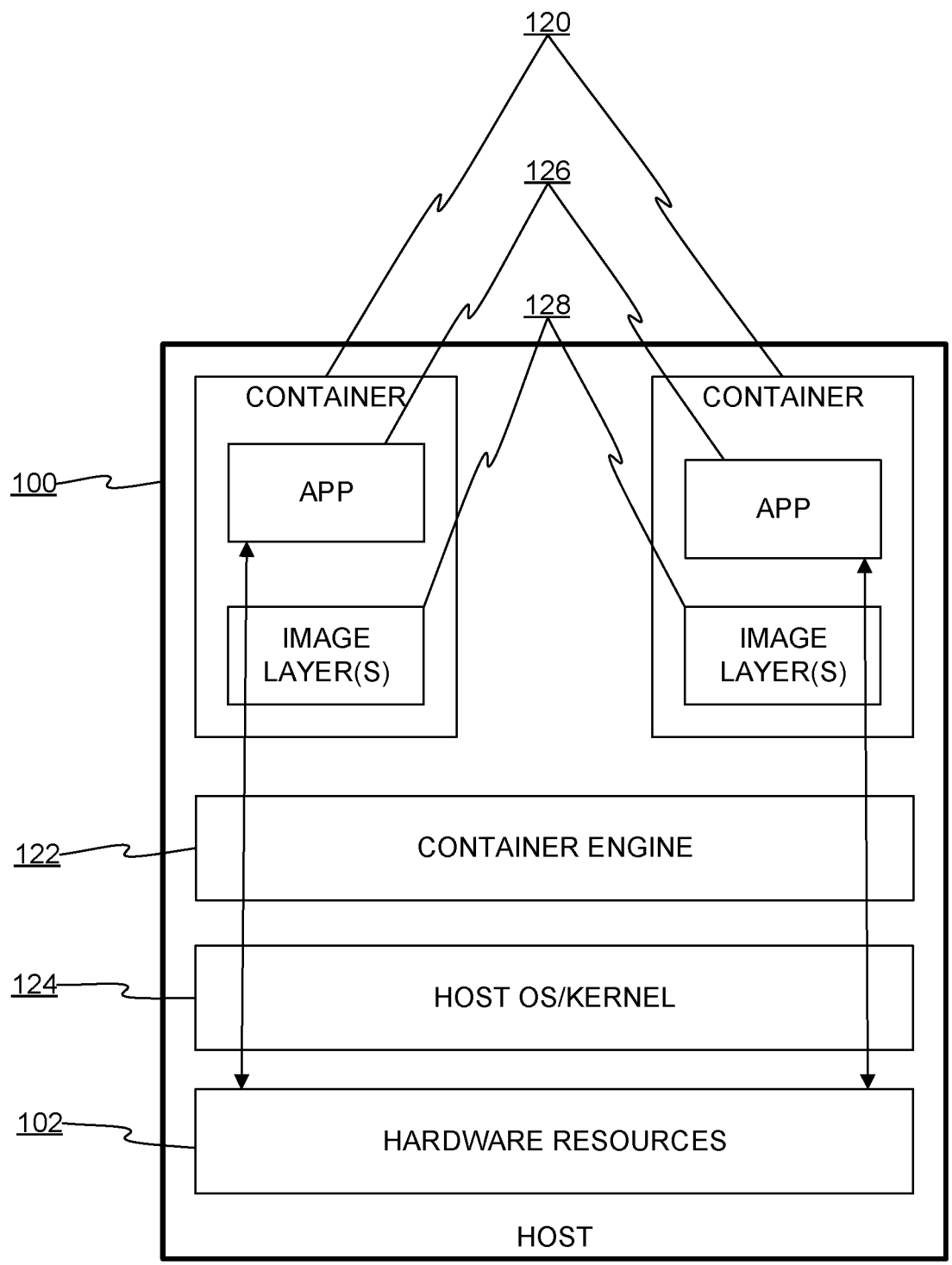
FIG. 2 shows virtualization partitions (VPs) implemented as containers.

FIG. 2 shows virtualization partitions implemented as containers 120. The containers 120, sometimes referred to as process containers, are examples of VPs. The containers 120 are implemented by a container engine 122. The containers 120, and the container engine 122, comprise processes executed by a host operating system and kernel 124. As such, the containers do not have their own kernels but instead share the host's kernel. The container engine 122 primarily uses namespace virtualization to provide containers 120 with isolated access to resources managed by the shared host operating system. The namespace-isolated resources may be filesystems, network interfaces or addresses, user names, and process identifiers, among others. In the case of a file namespaces, for example, the container engine maps between the host's filesystem namespace and a container's private filesystem namespace; guest software sees private filepaths, for instance, for files stored with different paths in a host filesystem that may be shared among containers 120. In short, the container engine 122 provides containers 120 with an abstraction of the interface between the host operating system and the container processes. In addition, the container engine 122 usually restricts certain sensitive system calls from within containers. The container engine 122 may in practice comprise a suite of processes and is usually accompanied by a container/virtualization manager with an interface to allow users to configure, provision, execute, and delete containers. Examples of container engines include Docker, Windows Containers, Hyper-V Containers, Windows Server Containers, Rkt, to name a few. Cloud implementations such as the Google Kubernetes Engine are also well-known and readily available.

Details for structuring and implementing containers 120 are known and, excepting modifications discussed herein, explanation of same may be found elsewhere. Generally, a container 120 is configured to run some specific software. To that purpose, consistent with the objective of portability, a container image is usually built to include one or more applications 126, as well as layers of binary libraries 128, files, and other data that may be needed to provide the runtime environment needed by the applications. As such, containers are well suited to providing necessary compatibility that may be lacking in the host environment.

Figure 3:
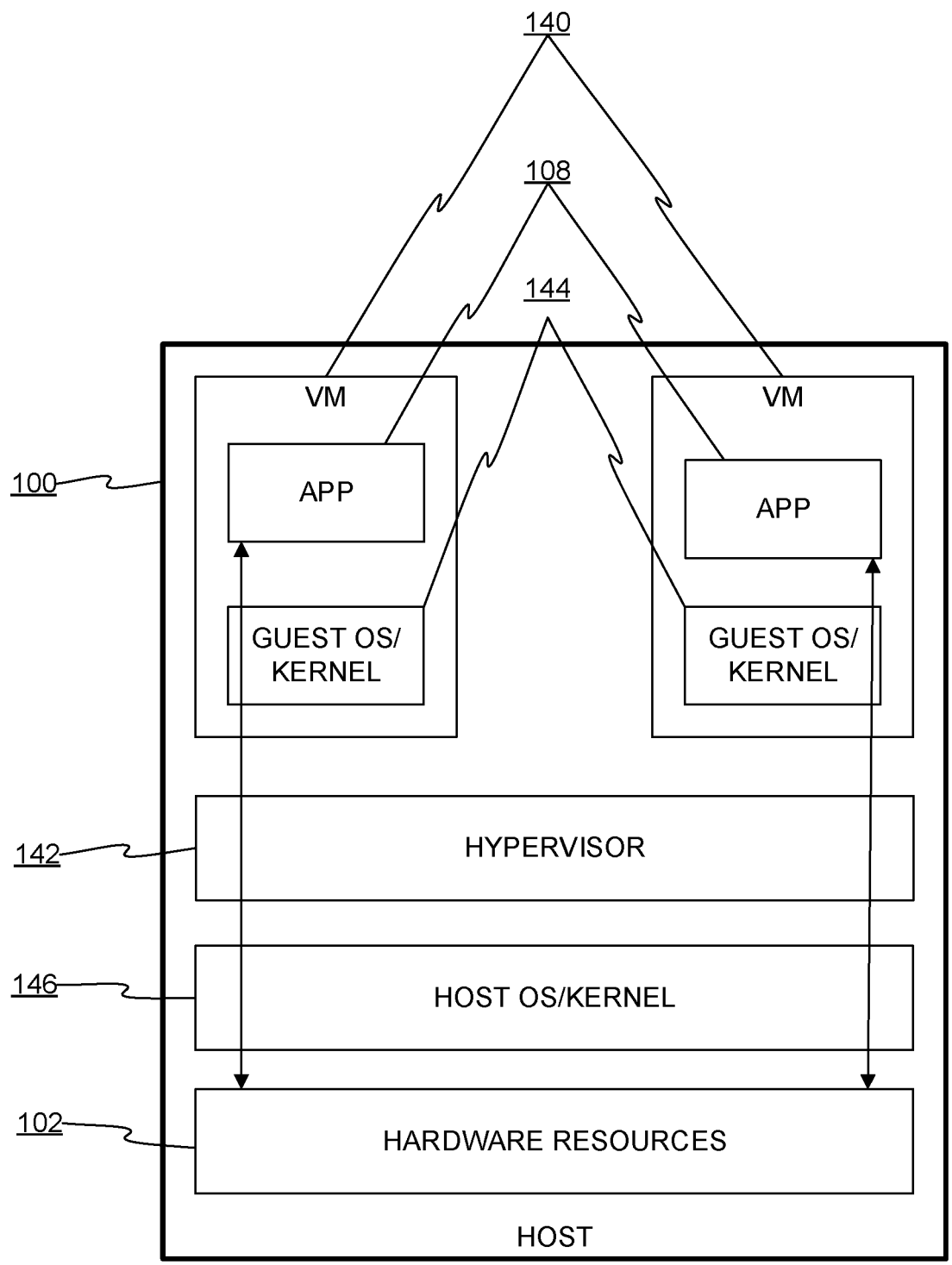
FIG. 3 shows a virtualization environment for providing virtual machines (VMs).

FIG. 3 shows a virtualization environment for providing virtual machines (VMs). The environment includes a known type of hypervisor 142. The host's hardware resources 102 may include a central processing unit (CPU), memory, a network interface card (NIC), non-volatile storage, a system bus, a display and/or display adapter, etc., some or all of which may be virtualized by the hypervisor 142. The hypervisor 142 manages and facilitates execution of the VMs 140. Each VM 140 typically has virtual devices including a virtual disk within which a guest kernel and operating system 144 are stored. In some implementations, machine or system virtualization is provided by the hypervisor 142 cooperating with a host operating system 146.

In one implementation, the tasks of virtualization may be distributed between the hypervisor 142 and a privileged VM in known ways (the privileged VM will be referred to as a host VM). In some implementations, the host VM might consist of only minimal virtualization elements such as tools and user interfaces for managing the hypervisor 142 and VMs. In other implementations, the host VM might include one or more of: device virtualization management, facilities for inter-VM communication, running device drivers, starting, or stopping other VMs, etc. In some embodiments, virtualization may mostly take place within the hypervisor's kernel (or a virtualization module that plugs into a stock kernel) and there is no host VM.

In the machine-virtualization embodiment shown in FIG. 3, the virtualization layer can be any combination of hypervisor 142 or virtualization kernel module as discussed above, and possibly other privileged components such as a host VM. The virtualization layer might be configured to support paravirtualization. Some virtualization systems may provide paravirtualization support that properly configured guests (e.g., drivers, kernels) can take advantage of for efficient device access. The paravirtualization approach is known and details may be found elsewhere. For convenience, any of the known machine-virtualization variations mentioned above will be generally referred to herein as a hypervisor.

Figure 4:
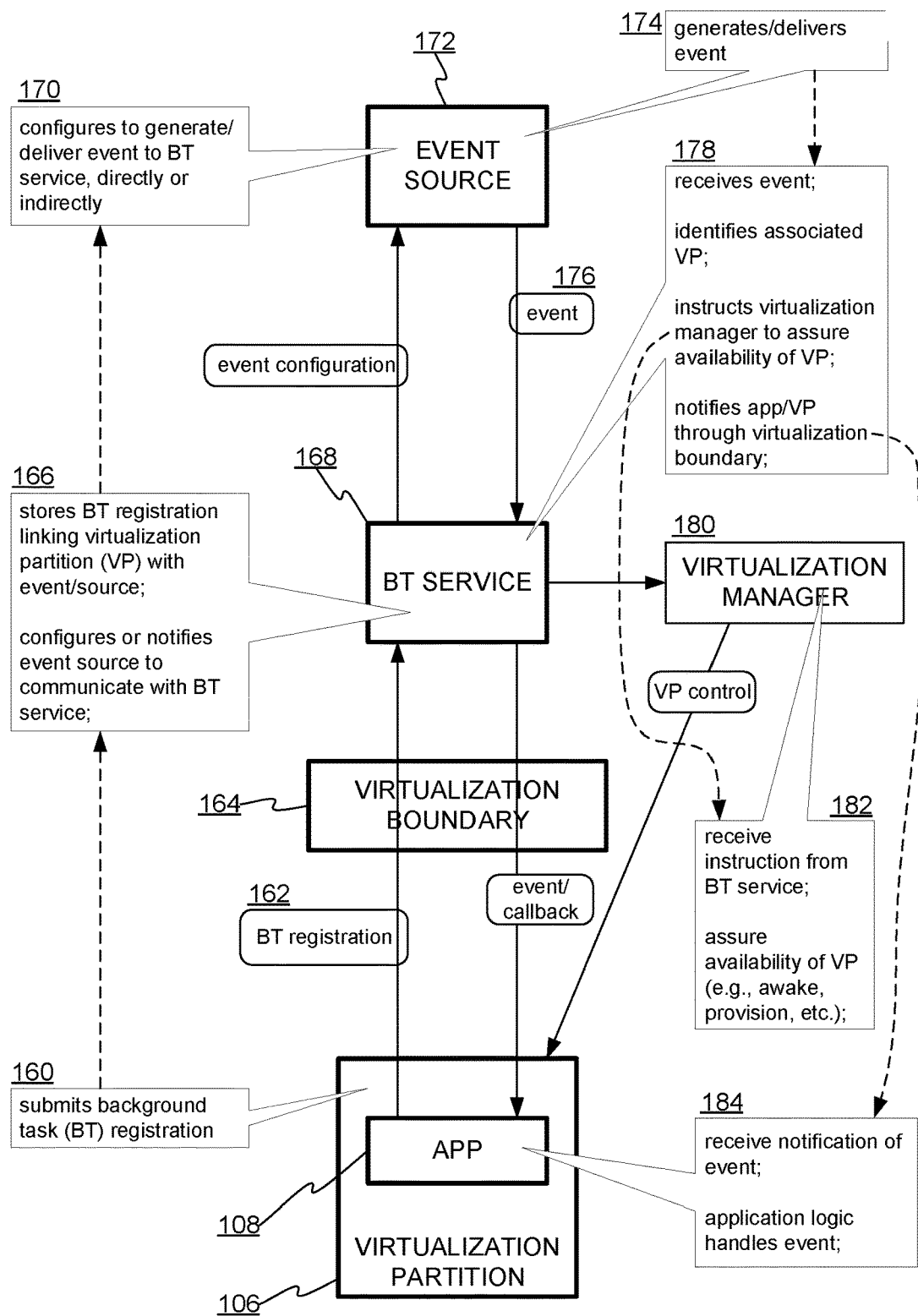
FIG. 4 shows a system that enables reliable background tasks (BT) for an application in a VP.

FIG. 4 shows a system that enables reliable background tasks for an application 108 in a VP 106. As discussed in the Background, because the application 108 is wrapped in a VP 106, the application's behavior is sometimes superseded by behavior of the VP as controlled by the virtualization layer. If the VP is unavailable, then the application 108 may not be able to generate or respond to background tasks. Components and steps shown in FIG. 4 may allow the application 108 to avoid the problems that virtualization may present for the execution of background tasks.

The application 108 executing in the VP 106 is the point at which a virtualized background task begins. It is the responsibility of the application, possibly with the assistance of other modules, to initiate extending background task information beyond the VP of the application. Before discussing that extension, some explanation of background tasks is in order. Background tasks in the context of this description are not just processes that execute without user involvement. A background task is a formal construct provided by many operating systems. An application programming interface (API) can be invoked by a process or application to inform the operating system (or a service) that the application may need to do things that suspension might interfere with, which the operating system might then attempt to honor for the application. While embodiments described herein are new in that they implement background tasks in the face of virtualization problems, from the application perspective, the APIs that are used may be similar to conventional non-virtualized background task APIs (the API implementations described herein are not conventional) provided by operating systems such as OSX/IOS (Background-Tasks Framework), Android (WorkManager), and Windows (see the Background namespace). Note that some embodiments may use methods other than an API (e.g. a configuration file, a special operating system setting, IPC, etc.) to inform the operating system about background processing.

With this in mind, at step 160 the application 108 makes a call to submit a background task (BT) registration 162. The information in the BT registration 162 can vary, as discussed further below, but at least allows the BT to be linked to the application. The registration 162 can be a unique identifier (ID) and the VP might retain information associating the ID with the BT. Thus, if the application or an assistant module VP receives an external message for the application to execute the BT, the ID can be used to identify the BT. Alternatively, the BT registration 162 might include information identifying the application, so that external BT infrastructure can call into the VP to invoke the application.

The call for the BT registration 162 is made through a virtualization boundary 164, which may be part of the virtualization layer. Preferably, the call uses a communication channel provided by the virtualization layer with endpoints in the VP and an external component such as the BT service 166, which will be described shortly. Examples of such channels are Windows Hyper-V Sockets, Xen Hypercalls, the VMware Virtual Machine Communication Interface, among others. Usually this type of communication does not pass through any network layers and is a form of inter-process communication. In the VP, the code to open/read/write the through-VP endpoints will be in the code that implements the BT registration steps.

At step 166, the BT registration 162 is received by a BT service 168 executing under the direct control of the host operating system or in another VP. The BT service 168 stores the BT registration 162 or information derived therefrom and links the BT registration to the source VP. The BT service 168 may maintain a table of background tasks and the respective VPs from which they originated.

At step 170, the BT service 168 also configures an event source 172 according to the BT registration. The type of the event source and the configuration thereof will depend on the BT registration, which can specify a type of background task and properties thereof. For example, if the BT registration is for an alarm, the event source 172 may be a system timer and the configuring might include arming a timer with recurrence (if any) and times specified by the BT registration request. Other types of event sources are possible, for example notification sources (local applications or listeners for remote notification services), local or remote services, etc., configuration of which may vary accordingly so that the event sources can communicate with the BT service, directly or indirectly.

As will become clear with further discussion, after the application has issued its BT registration request, and assuming the related registration steps are successful, the application's VP can be rendered unavailable by the virtualization layer without concern for being able to respond to the registered background task.

At step 174, the event source 172 generates an event 176 corresponding to the BT registration. For instance the event source 172 generates an alarm, a push notification, or some other application-level event.

At step 178 the BT service 168 receives the event 176. Based on the event or possibly the communication means through which it was received, the BT service 168 consults its BT registrations to find the identity of the VP associated with the event 176. At this point, the BT service 168 knows that there is an event associated with a background task and also knows the identity of the VP needed to handle the event. The BT service 168 communicates with the virtualization layer to assure that the VP is available to handle the event. This may involve a call identifying the VP and a desired state or operation for the VP that would assure availability of the VP. The virtualization layer may be called into directly or the BT service 168 may call a virtualization manager 180 which in turn manipulates the virtualization layer. The virtualization layer manipulation may involve checking the status of the identified VP. If the VP is unavailable, then appropriate steps may be taken, for instance waking the VP, providing the VP (or a corresponding virtual processor) with unscheduled or high-priority execution time, removing the VP from a low-power state, or, as discussed further below, provisioning a new VP.

The BT service may either proceed asynchronously or wait for an availability confirmation from the virtualization layer. In the asynchronous case where the BT service is not aware that the VP was not rendered available, there is no harm in the BT service attempting and failing to communicate with the VP about the BT event. The mechanism that the BT service uses will usually be the same mechanism that was used by the VP to submit the BT registration, i.e. a call conveyed over an inter-process communication channel that traverses the virtualization boundary and that has endpoints in the BT service and the VP.

As noted above, at the behest of the BT service a virtualization manager 180 may perform steps 182 that assure availability of the relevant VP.

At this stage, in some embodiments no further steps are taken. The VP is available and executing and the application that registered the background task might be assumed to also be executing. Background events that flow to the application if the application executing will do so. For example, push notifications or network messages will flow through ordinary paths to the application in the executing VP. Other embodiments or types of events may involve signaling the application about the background event. For instance, notice of a timed alarm event will need to flow through to the application. In some embodiments, in particular when the VP is a VM, it might be desirable to pass through notification to the application regardless of the event type. The application might be suspended or asleep or suspended within the VP and notification may serve to assure action by the application. If necessary, at step 184 the application receives a signal or callback, possibly specifying an entry point for the application, and the application completes the background task.

Figure 5:
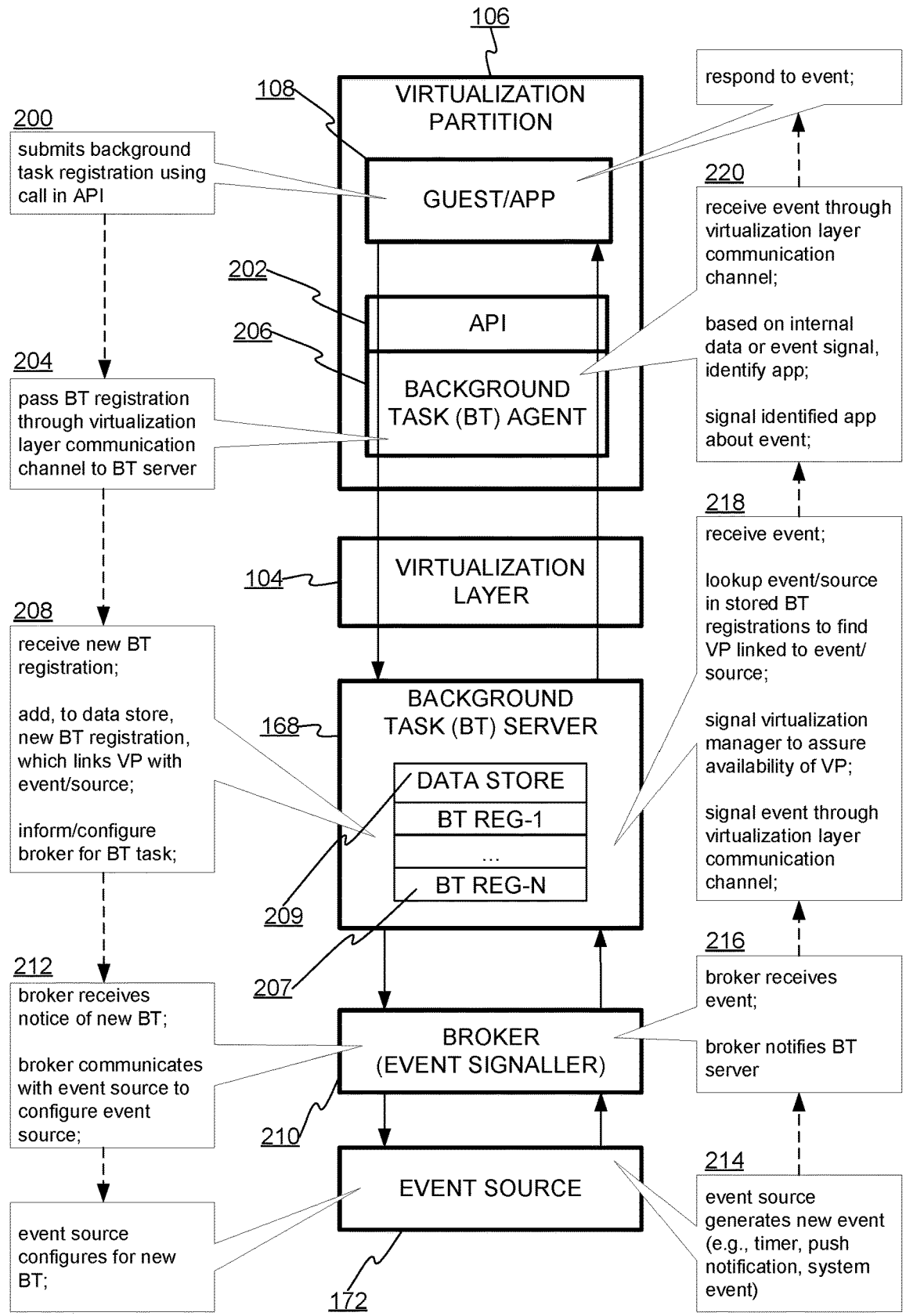
FIG. 5 shows details of an embodiment with additional modules.

FIG. 5 shows details of an embodiment with additional modules. At step 200 the application 108 calls a function or method of an API 202. The API can be implemented as a class interface or contract. The call within the VP can be through a Remote Procedure Call (RPC). In one embodiment, at step 204 the call is executed by a BT agent 206 executing in the VP. In another embodiment, the call may be executed by code linked to the application. As discussed further below, the BT agent might persist active BT registrations and refresh volatile BT registrations in the BT service each time the VP is activated, thus assuring that extra-VP BT registrations remain active if the host reboots, the BT service crashes, etc.

At step 204 the BT agent 206 issues a call out of the VP, through the virtualization layer, to the BT service 168. In this embodiment, the call may be implemented as a virtualization-safe implementation of RPC, as disclosed in U.S. patent application Ser. No. 16/439,239, titled "Distribution and Management of Services in Virtual Environments", filed Jun. 12, 2019, (referred to hereafter as v-RPC). The v-RPC call creates a trigger and callback to the BT agent 206. At step 208 the BT service 168 works much like step 166 discussed above, with the new BT registration 207 being stored in a table 209, but in this embodiment the BT service uses a broker 210 to intermediate events between the BT service and the event source 172. At step 212 the broker 210 communicates with the event source to configure the new event trigger.

At step 214 an event associated with the previously registered virtualized BG task occurs. That is, a timer fires, a push notification is received, an application-level message is received by the host's network stack, an operating system signal or event is generated, etc. At step 216 the broker receives the event and notifies the BT service. At step 218 the BT service, which has previously stored an association between the event and indicia of the corresponding VP, finds the VP associated with the event, instructs the virtualization layer to assure availability of the VP, and signals through the virtualization layer to the BT agent 206. At step 220 the BT agent 206 responds to the event by triggering the associated application.

In addition to the steps above, if RPC is being used, the BT agent may, during registration, associate an entry point in the application (specified by the application's original registration call) with the BT registration or other indicia of the event such as an RPC activation ID or a work item of the BT agent. In response the BT service associates the event/trigger with the background task in the VP, e.g. a work item in the VP. When the broker 210 receives an event such as a timer alarm, the broker may use an asynchronous RPC call to the BT service. The BT service dereferences an ID of the event/call from the broker to identify the work item or call target in the VP. The BT service then makes a v-RPC call to activate the work item or call target. The BT agent, which has previously associated an entry point (e.g., an activation ID), activates the entry point associated with the activated work item. The activation then flows through to the application, possibly through an intermediary such as distributed common object model (DCOM) module. The application may respond by beginning execution at the entry point.

As noted earlier, some embodiments described herein are practical for assuring that a VP associated with a background event is available to respond to a BG event, even if handling the BG event does not include triggering execution of the associated application in the corresponding VP. However, as shown above, in other embodiments the notion of VP availability can be extended to activation of guest software in association with a BG event outside the VP. In some embodiments discussed below, the VP being rendered available need not be the same VP that registered the virtualized background task.

Figure 6:
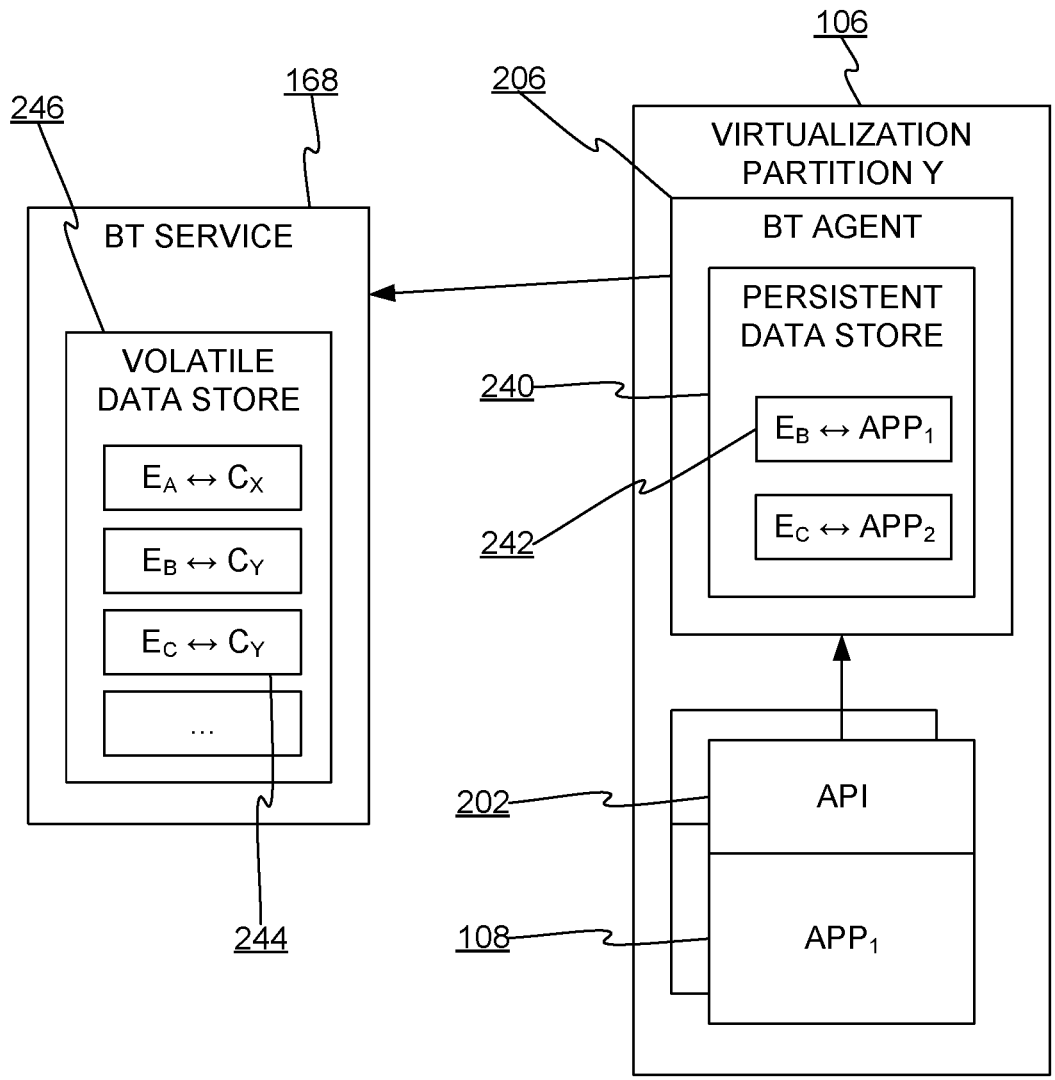
FIG. 6 shows an embodiment where only a VP persistently stores information about an application invoking virtualized BT functionality.
Figure 7:
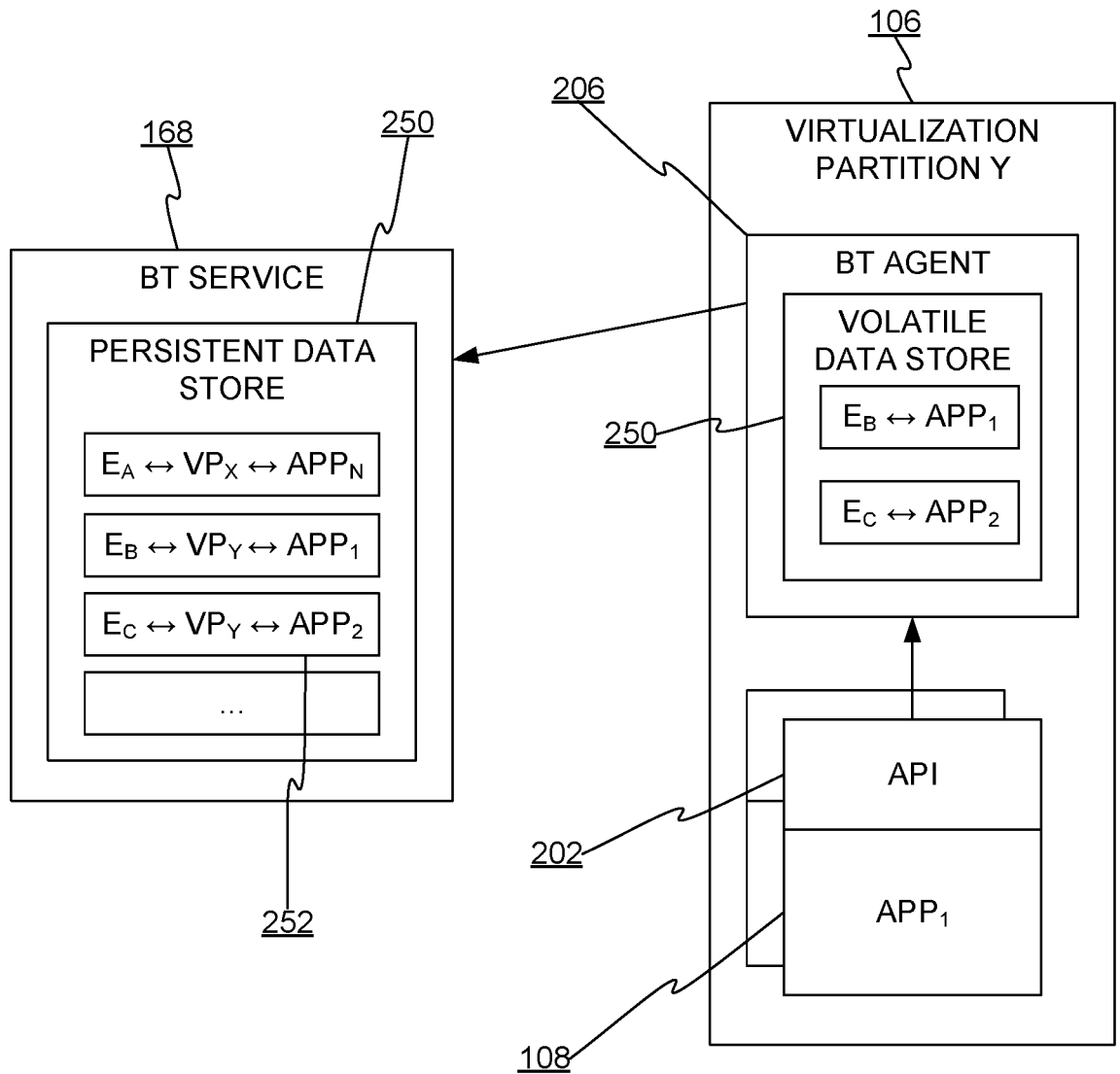
FIG. 7 shows an embodiment where only a BT service (or other host-side component) persistently stores information about the application requesting virtualized BT support.

As discussed next with reference to FIGS. 6 and 7, the same activation model can be implemented in different ways for different balances between security and performance. FIG. 6 shows an embodiment where only the VP persistently stores information about the application invoking virtualized BT functionality. FIG. 7 shows an embodiment where only the BT service (or other host-side component) persistently stores information about the application requesting virtualized BT support.

Referring to FIG. 6, the BT agent 206, or another VP-side component in the chain of BT registration/handling, includes a VP-side persistent data store 240. Each time a virtualized background task is registered from within the VP, the BT agent adds an association 242 between the event and the application. The VP-side persistent data store 240 stores all of the BT registrations for the VP. In addition, each time the VP is started, booted, activated, etc., the BT agent informs the BT service about its registered BT events, and the BT service then stores associations 244 with the VP in its host-side volatile data store 246. If application activation is needed, the BT agent has all of the information necessary to complete that aspect of virtualized background tasks.

In this embodiment, the only information leaked out of the VP is the existence of a BT event in association with the VP. The identifiers of the VP and the identifiers of the events need not reveal information about how the background tasks are handled within the VP. And even that information is not persisted outside the VP. The non-persistence of the host-side information can improve security and reduce stale entries. In addition, with this embodiment, if application activation is desired, it may be more difficult to allow the VP to become unavailable, because the host side does not have sufficient information to activate the application in the VP.

Referring to FIG. 7, the BT service 168 includes a host-side persistent data store 250. Each time a virtualized background task is registered from within the VP, the BT service 168 adds an association 252 between the event and the application. Background task registration information may also be stored in a VP-side volatile data store 254 stores BT registrations for the VP. Because the host-side background task information is persistently stored, the VP-side volatile data store 254 can be omitted and the BT service is presumed to consistently have the information needed for handling VP availability and activating applications.

In this embodiment, the VP leaks out the existence of a BT event, its association with the VP, and possibly details about the application to be activated in the associated VP. The persistence of the host-side information may have a minor security implication but also improves power and computation efficiency by making it more practical to render the relevant VP unavailable, e.g. put in a low-power state.

As can be seen from FIGS. 5-7, if application activation is to be implemented, an RPC call to activate an application can be initiated either outside the VP (e.g., by the BT service) or within the VP (e.g. by the BT agent), depending on where application activation information is stored.

Although the embodiments above have been described as being implemented on a single host computing device, the VPs and the extra-VP infrastructure can reside on different devices. In one embodiment, the VPs are provided by a cloud service and the VP manipulations discussed above are implemented by an API of the cloud service. References herein to host-side components also refer to components executed in a cloud or on different hosts.

As noted above, in some embodiments a VP associated with a registered background task will be unavailable because it has been removed from the host or because a task has been registered without a VP. In this case, with some additional host-side information, a VP and application can nonetheless handle the events of the background task. One approach is to maintain a catalog or history of which VPs have been associated with which registrations or events/activations. If the BT service handles an event and instructs the virtualization layer to assure availability of the corresponding VP, and if the virtualization layer finds that the VP does not exist, then the virtualization layer provisions a new VP on-the-fly to handle the task. If the new VP has a different identifier than the identifier currently registered with the BT service, then the identifier can be updated. A dummy VP identifier in the BT registration can point into an index of a VP library.

Virtualized background task registrations may include more than just information to link events with VPs and containers. Virtualized background task registrations may also include a user identity to activate, which class to activate, information about the application, and other information.

In some embodiments, BT registrations are removed when their corresponding VPs are deleted or decommissioned. In another embodiment a BT registration can be flagged as persistent and will outlive its VP. Events can be handled by on-the-fly provisioning, as discussed above.

In some embodiments, BT registrations have additional metadata such as priorities or weights. If the hardware hosting the VP becomes power constrained (e.g. it only has battery power available, and the battery falls below a certain threshold), only higher priority BT will be allowed to run. Some embodiments implement this through scheduling of tasks and jobs. Other embodiments implement this through limiting, postponing and/or dropping lower priority events.

Figure 8:
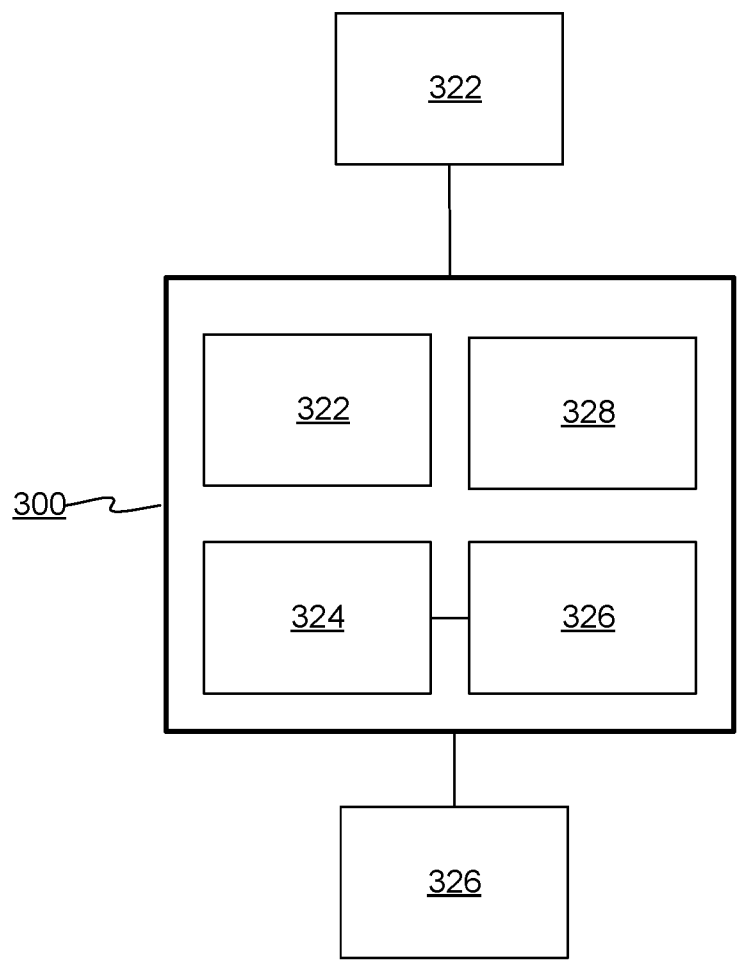
FIG. 8 shows details of a computing device that may serve as the host.

FIG. 8 shows details of a computing device 300 that may serve as the host 100. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326, which may be local and/or remote, may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware and storage hardware, the method comprising:
   executing a virtualization partition (VP) by a virtualization layer, the virtualization layer providing the VP with isolated virtualized access to operating system and/or hardware resources of the computing device, the VP comprising an application configured to execute a background task within the VP;
   receiving, by a service external to the virtualization layer, a registration request from the application through a virtualization boundary that is part of the virtualization layer, the virtualization boundary separating the application from the service;
   registering the background task with the service based on the registration request, wherein registering the background task with the service comprises storing an association between the VP and the background task at the service;
   receiving, at the service, an event corresponding to the background task;
   determining, by the service, an identity of the VP associated with the event based on the association between the VP and the background task;
   determining, by the service, that the VP is unavailable to execute the background task; and
   instructing, by the service, the virtualization layer to make the VP available to execute the background task.

2. A method according to claim 1, wherein the VP comprises a container and the virtualization layer comprises a container engine that manages execution of the container.

3. A method according to claim 1, wherein the VP comprises a virtual machine, and wherein the virtualization layer comprises a hypervisor that manages execution of the virtual machine.

4. A method according to claim 1, further comprising:
   calling, by the application, a procedure to register the background task; and
   responding, by the service, to registering the background task by forming the association between the VP and the background task.

5. A method according to claim 4, wherein instructing the virtualization layer to make the VP available comprises triggering activation of the application.

6. A method according to claim 5, wherein activation information for activating the application is persistently stored in the VP, and the activation is triggered within the VP according to the activation information.

7. A method according to claim 5, wherein activation information for activating the application is persistently stored by the service, and the activation is triggered by the service according to the activation information.

8. A method according to claim 1, wherein the virtualization layer provides VP communication channels for inter-process communication, each VP communication channel having an endpoint in a given VP and an endpoint in a process outside of the given VP, and wherein a VP communication channel is used to either (i) convey registration of the background task from the VP to the service, or (ii) activate the application based on the background task.

9. A computing device comprising:
   processing hardware;
   storage hardware storing information configured to cause the processing hardware to perform a process comprising:
      receiving, by a service, a registration request from a guest application in a virtualization partition (VP) being executed by a virtualization layer that virtualizes access to resources of the computing device for the VP, the registration request being received through a virtualization boundary of the virtualization layer, the virtualization boundary separating the guest application from the service, the service being external to the virtualization layer;
      registering, by the service, a background task to be executed by the guest application based on the registration request, wherein registering the background task comprises storing an association between an identifier of the VP and an identifier of an event corresponding to the background task;

receiving, by the service, an indication of occurrence of the event; and providing, by the service, the indication to the VP, wherein providing the indication to the VP causes the VP to enter a state of executing during which the VP takes an action that corresponds to the background task.

10. A computing device according to claim 9, wherein the computing device comprises a host and a cloud service, and wherein the cloud service executes the VP.

11. A computing device according to claim 9, wherein providing the indication to the VP triggers an activation of the guest application.

12. A computing device according to claim 11, wherein the guest application is triggered with a Remote Procedure Call (RPC) invocation.

13. A computing device according to claim 9, wherein causing the VP to enter a state of executing comprises waking the VP, removing the VP from a low-power state, or scheduling execution time for the VP.

14. A computing device according to claim 9, the process further comprising:

storing indicia of the background task in the VP; and when the VP begins executing, based on the indicia of the background task, configuring a service outside of the VP with a new association between an identifier of the VP and an identifier of the event corresponding to the background task.

15. A computing device according to claim 9, wherein the registration request for the background task comprises alarm configuration, wherein the process further comprises arming a timer alarm outside of the VP based on the alarm configuration, wherein the event comprises firing of the timer alarm.

16. A computing device according to claim 15, wherein the action taken by the VP occurs at an entry point in the guest application that the guest application specified in association with requesting the background task.

17. Computer storage hardware storing information configured to cause one or more computers to perform a process, the process comprising:

receiving, by a background task virtualization module, a signal of an event associated with a background task to be executed by an application in a virtualization partition (VP), the application being configured to execute the background task and being separated from the background task virtualization module by a virtualization layer, wherein the background task virtualization module is external to the virtualization layer;

in response to the signal of the event, identifying, by the background task virtualization module, an identifier of the VP based on a previous registration of the background task with the background task virtualization module through a virtualization boundary of the virtualization layer; and communicating, by the background task virtualization module, the identifier of the VP to a virtualization module, wherein communicating the identifier of the VP causes the VP to transition from a first state to a second state, the first state comprising a low-power state, a paused state, or a suspended state.

18. Computer storage hardware according to claim 17, the process further comprising: further based on the signal, triggering a response to the event by an application in the VP.

19. Computer storage hardware according to claim 17, the process further comprising receiving a request from the application to register the background task, and based thereon storing, by the background task virtualization module, an indication of the background task, wherein the identifier of the VP is found from the indication of the background task.

20. Computer storage hardware according to claim 17, wherein the process further comprises accessing background task registrations, wherein the background task registrations comprise respective priorities or weights, and wherein decisions to execute VPs are based on the respective priorities or weights.

* * * * *